US008649436B2

(12) United States Patent
Watanabe

(10) Patent No.: US 8,649,436 B2
(45) Date of Patent: Feb. 11, 2014

(54) METHODS FOR EFFICIENT IMPLEMENTATION OF SKIP/DIRECT MODES IN DIGITAL VIDEO COMPRESSION ALGORITHMS

(75) Inventor: Hitoshi Watanabe, San Jose, CA (US)

(73) Assignee: Sigma Designs Inc., Milpitas, CA (US)

( * ) Notice: Subject to any disclaimer, the term of this patent is extended or adjusted under 35 U.S.C. 154(b) by 2340 days.

(21) Appl. No.: 11/209,913

(22) Filed: Aug. 22, 2005

(65) Prior Publication Data

US 2006/0039476 A1 Feb. 23, 2006

Related U.S. Application Data

(60) Provisional application No. 60/603,228, filed on Aug. 20, 2004.

(51) Int. Cl.
*H04B 1/66* (2006.01)
(52) U.S. Cl.
USPC .................................. 375/240.16
(58) Field of Classification Search
USPC ........................ 375/240.16, 240.24
IPC ................ H04N 11/02,7/12, 11/04; H04B 1/66
See application file for complete search history.

(56) References Cited

U.S. PATENT DOCUMENTS

| 6,005,626 | A | 12/1999 | Ding |
| 6,335,990 | B1 | 1/2002 | Chen et al. |
| 6,353,700 | B1 * | 3/2002 | Zhou .............................. 386/68 |
| 6,657,676 | B1 | 12/2003 | Borneo et al. |
| 6,917,652 | B2 * | 7/2005 | Lyu ........................... 375/240.25 |
| 7,469,070 | B2 * | 12/2008 | Winger ......................... 382/239 |
| 7,787,542 | B2 * | 8/2010 | Sun et al. ................. 375/240.29 |
| 2005/0135484 | A1 * | 6/2005 | Lee et al. ................. 375/240.16 |
| 2005/0152452 | A1 * | 7/2005 | Suzuki ..................... 375/240.16 |
| 2005/0286635 | A1 * | 12/2005 | Kumar et al. ............ 375/240.16 |
| 2006/0193385 | A1 * | 8/2006 | Yin et al. ................. 375/240.12 |

OTHER PUBLICATIONS

Gary Sullivan, Thomas Wiegand, Ajay Luthra, "Draft of Version 4 of H.264/AVC (Document JVT-NO50d1)", Jan. 28, 2005, JVT.

* cited by examiner

*Primary Examiner* — Tung Vo
(74) *Attorney, Agent, or Firm* — Perkins Coie LLP; Aaron Wininger

(57) ABSTRACT

The approach of the present invention is to take advantage of similarity in implementation between SKIP and DIRECT modes and one other inter-picture prediction modes, namely, the 16×16 partition mode. The SKIP/DIRECT modes are classified into two groups, one involving inter-picture prediction in one temporal direction in which prediction is chosen from either past or future recon pictures, and the other involving prediction in two temporal directions in which prediction is constructed as a superposition of both past and future recon pictures. The first group requires interpolation for only one direction, whereas the latter requires interpolation for both directions, thus requiring roughly twice as much data processing power than the first group. The 16×16 partition mode also allows both prediction schemes, either past or future, or a superposition of past and future. The SKIP/DIRECT and 16×16 partition modes all apply the same motion vector on the entire block unit.

Methods of the present invention consider the SKIP/DIRECT modes if and only if the final prediction information of the 16×16 partition mode, including motion vector, reference picture index, and prediction direction, is the same as that of the respective SKIP and/or DIRECT modes. The point here is that the same motion prediction, reference picture index and prediction direction are used for the 16×16 partition mode and the SKIP/DIRECT modes, and therefore, the same interpolation scheme can be used for both SKIP/DIRECT and 16×16 partition modes, thus saving computational cost as well as implementation cost.

7 Claims, 3 Drawing Sheets

METHODS FOR EFFICIENT IMPLEMENTATION OF SKIP/DIRECT MODES IN DIGITAL VIDEO COMPRESSION ALGORITHMS

CROSS REFERENCE

This application claims priority from a U.S. provisional patent application entitled "Efficient implementation of Skip/Direct modes in digital video compression algorithm" filed on Aug. 20, 2004, having an application No. 60/603,228. This provisional patent application is incorporated herein by reference.

FIELD OF INVENTION

This invention relates to digital video compression algorithms and, in particular, relates to the selection of a prediction mode from a plurality of prediction modes in such compression algorithms.

BACKGROUND

In the modern digital video compression standards including but not limited to MPEG-X (X=1, 2, 4) as well as H.26L (L=1, 2, 3, 4), compression typically occurs in two steps: prediction in a first step and prediction error correction (residue coding, hereafter) in a second step. In the said video compression standards, two types of prediction modes are provided, namely intra-picture prediction and inter-picture prediction. In inter-picture prediction, a sub-unit of picture currently being encoded (current picture, hereafter) is compared against portions of previously reconstructed picture(s) (recon picture(s), hereafter) and the location of the best matching portion, typically consisting of motion vector, reference picture index and prediction direction (collectively, prediction information, hereafter) are encoded. Some of the digital video compression standards or relevant video compression standards, including but not limited to H.264 (or equivalently, MPEG4/AVC), provide SKIP and/or DIRECT modes for inter-picture prediction. SKIP and DIRECT modes, if selected, do not require encoding of prediction information, and thus require minimum number of bits for encoding prediction information. SKIP and DIRECT modes, if selected correctly, have been proven to be quite effective in improving coding efficiency.

However, prediction information for SKIP and DIRECT modes can be generally different from all the other inter-prediction modes (for the purpose of this invention, details of how other available prediction modes are encoded are not important) and therefore, in the worst case, SKIP and DIRECT modes need to be additionally investigated to decide whether they should be considered in the selection of the best prediction mode. These additional investigations for the SKIP and DIRECT modes require interpolation of image data down to the supported pixel resolution (¼-pixel resolution in case of H.264 standard) and thus significantly increases the computational power requirement as well as the implementation cost. These overheads are undesirable especially for those applications where low cost and low power consumption are critical. Therefore, it is desirable to have novel methods for mode selection with minimal overhead.

SUMMARY OF INVENTION

An object of the present invention is to provide methods for efficient selection of prediction modes in video compression.

Another object of the present invention is to provide methods for eliminating DIRECT mode or SKIP mode as candidates in the selection of a prediction mode for video compression.

Briefly, this invention discloses methods for prediction mode selection for video compression among a plurality of prediction modes, comprising the steps of: calculating prediction information for each of the prediction modes; comparing calculated prediction information of the prediction modes; retaining certain ones of the prediction modes as a function of said compared prediction information; and selecting a prediction mode from the retained prediction modes.

An advantage of the present invention is that it provides methods for efficient selection of prediction modes in video compression.

Another advantage of the present invention is that it provides methods for eliminating DIRECT mode or SKIP mode as candidates in the selection of a prediction mode for video compression.

DESCRIPTION OF THE FIGURES

The foregoing and other objects, aspects and advantages of the invention will be better understood from the following detailed description of preferred embodiments of this invention when taken in conjunction with the accompanying drawings in which.

DETAILED DESCRIPTION OF THE PREFERRED EMBODIMENTS

Figure 1:
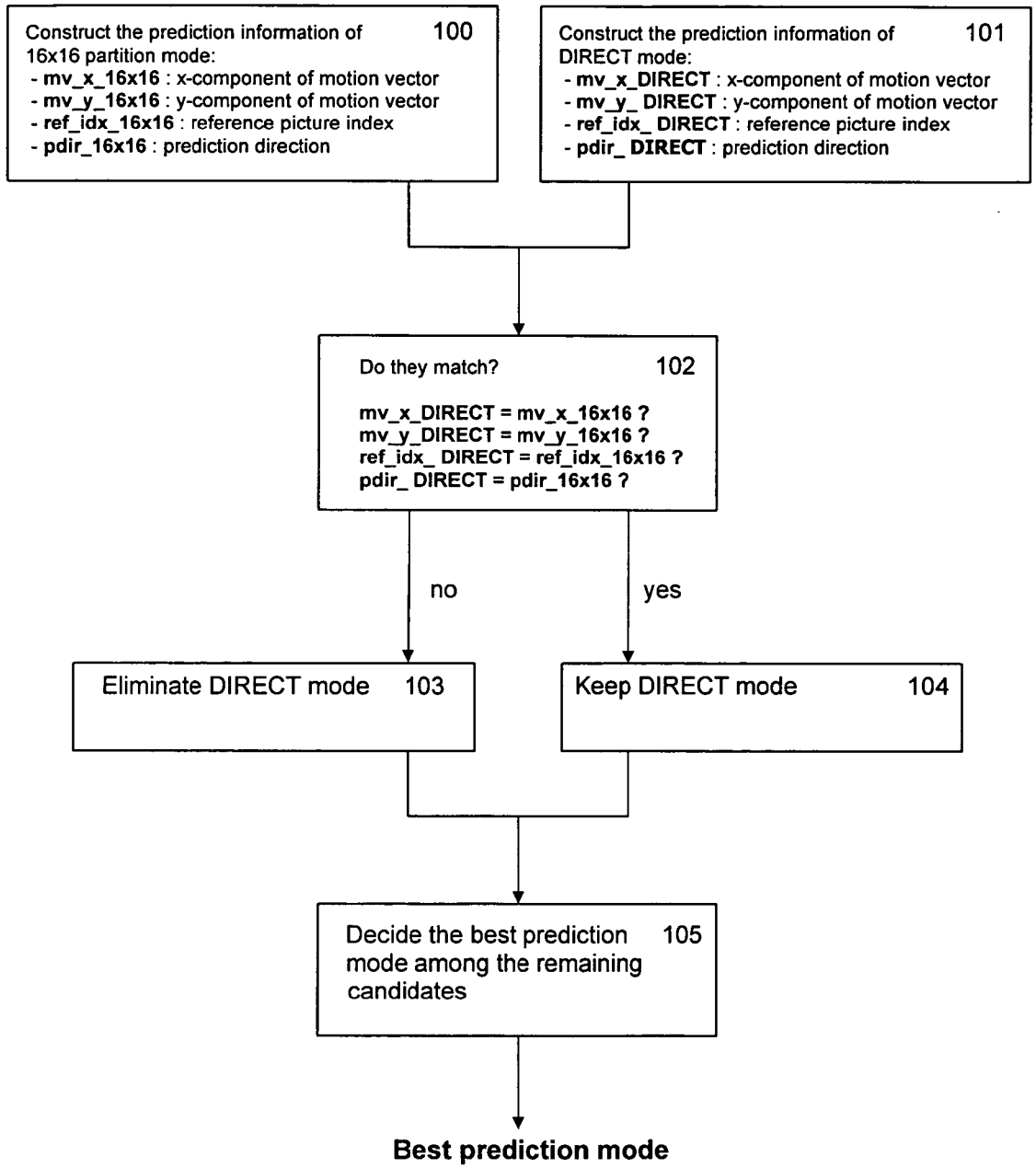
FIG. 1 illustrates a flow chart showing the decision making process in deciding whether to keep the DIRECT mode as a candidate in the selection of a best mode.

The approach of the present invention is to take advantage of similarity in implementation between SKIP and DIRECT modes and one other inter-picture prediction modes, namely, the 16×16 partition mode. The SKIP/DIRECT modes are classified into two groups, one involving inter-picture prediction in one temporal direction in which prediction is chosen from either past or future recon pictures, and the other involving prediction in two temporal directions in which prediction is constructed as a superposition of both past and future recon pictures. The first group requires interpolation for only one direction, whereas the latter requires interpolation for both directions, thus requiring roughly twice as much data processing power than the first group. The 16×16 partition mode also allows both prediction schemes, either past or future, or a superposition of past and future. The SKIP/DIRECT and 16×16 partition modes all apply the same motion vector on the entire block unit.

Methods of the present invention consider the SKIP/DIRECT modes if and only if the final prediction information of the 16×16 partition mode, including motion vector, reference picture index, and prediction direction, is the same as that of the respective SKIP and/or DIRECT modes. For the purpose of this invention, the details of how to construct the final prediction information of the 16×16 partition mode as well as that of the SKIP and DIRECT modes are not important. Those details may well differ from one implementation to another, depending on optimization strategy required by the target application.

The point here is that the same motion prediction, reference picture index and prediction direction are used for the 16×16 partition mode and the SKIP/DIRECT modes, and therefore, the same interpolation scheme can be used for both SKIP/DIRECT and 16×16 partition modes, thus saving computational cost as well as implementation cost.

Note that for the SKIP/DIRECT mode, there is one more condition that needs to be satisfied other than the motion vector, the reference picture index and the prediction direction, namely coded block pattern (CBP, hereafter). CBP indicates whether or not at least some prediction error needs to be encoded. By the definition given in the standard documentation, CBP is zero for the SKIP mode which means that no prediction error is encoded for the SKIP mode and CBP is nonzero for the DIRECT mode which means that prediction error is coded for the DIRECT mode. CBP is calculated and becomes available during residue coding (for the purpose of this invention, how CBP is calculated is not important). In the case where the SKIP mode is considered and CBP is nonzero, CBP may be set to zero in order to simulate and investigate the SKIP mode. To force the match by setting CBP to zero or not will then become a part of the decision making process in determining the final prediction mode. One key observation which motivates our proposal is that the computational as well as implementation overhead coming from checking a match between the 16×16 partition mode and the SKIP/DIRECT modes in the methods of the present invention is much smaller than those in the case of considering the SKIP/DIRECT modes as a separate prediction mode candidate regardless of the 16×16 partition mode.

In a presently preferred method of the present invention, FIG. 1 illustrates the presently preferred embodiment in the implementation of the decision with respect to the DIRECT mode. In 100, motion vector, reference picture index, and prediction direction are calculated for the 16×16 partition mode (mv_x__16×16, mv_y__16×16, ref_idx__16×16, and pdir__16×16, respectively). In 101, motion vector, reference picture index, and prediction direction are calculated for the DIRECT mode (mv_x_DIRECT, mv_y_DIRECT, ref_idx_DIRECT, and pdir_DIRECT, respectively). The motion vector, the reference picture index, and the prediction direction of the DIRECT mode are calculated from the motion vector, the reference picture index, and the prediction direction of the neighboring sub-units which are already determined, and the formula are defined in the specification document of relevant video compression standards. Also, for the purpose of this invention, the details of the methodology in calculating the motion vector, the reference picture index, and the prediction direction of 16×16 partition mode are not important and any standard methods for motion estimation such as those used in the existing standards including but not limited to MPEG-X (X=1, 2, 4) as well as H.26L (L=1, 2, 3, 4) can be used. In 102, the above prediction information of the DIRECT and 16×16 partition modes are compared against each other. If they do not match, the DIRECT mode is disregarded (103) from the candidate pool. If they match, the DIRECT mode is retained (104) in the candidate pool. In the comparison described above, matching criteria can be specified to require exact matching or allowing for certain amount of error.

The best mode is then chosen from the candidate pool among the remaining prediction mode candidates (which may include intra-picture prediction modes if they are available) (105). As described above, CPB for the DIRECT mode is nonzero and this condition needs to be satisfied in order to select the DIRECT mode as the best mode. For the purpose of this invention, the best mode selection is not limited to any particular methods and may be performed in accordance with available standard methods for mode selection including but not limited to the rate-distortion optimization method used in JM (Joint Model) reference C-model.

Figure 2:
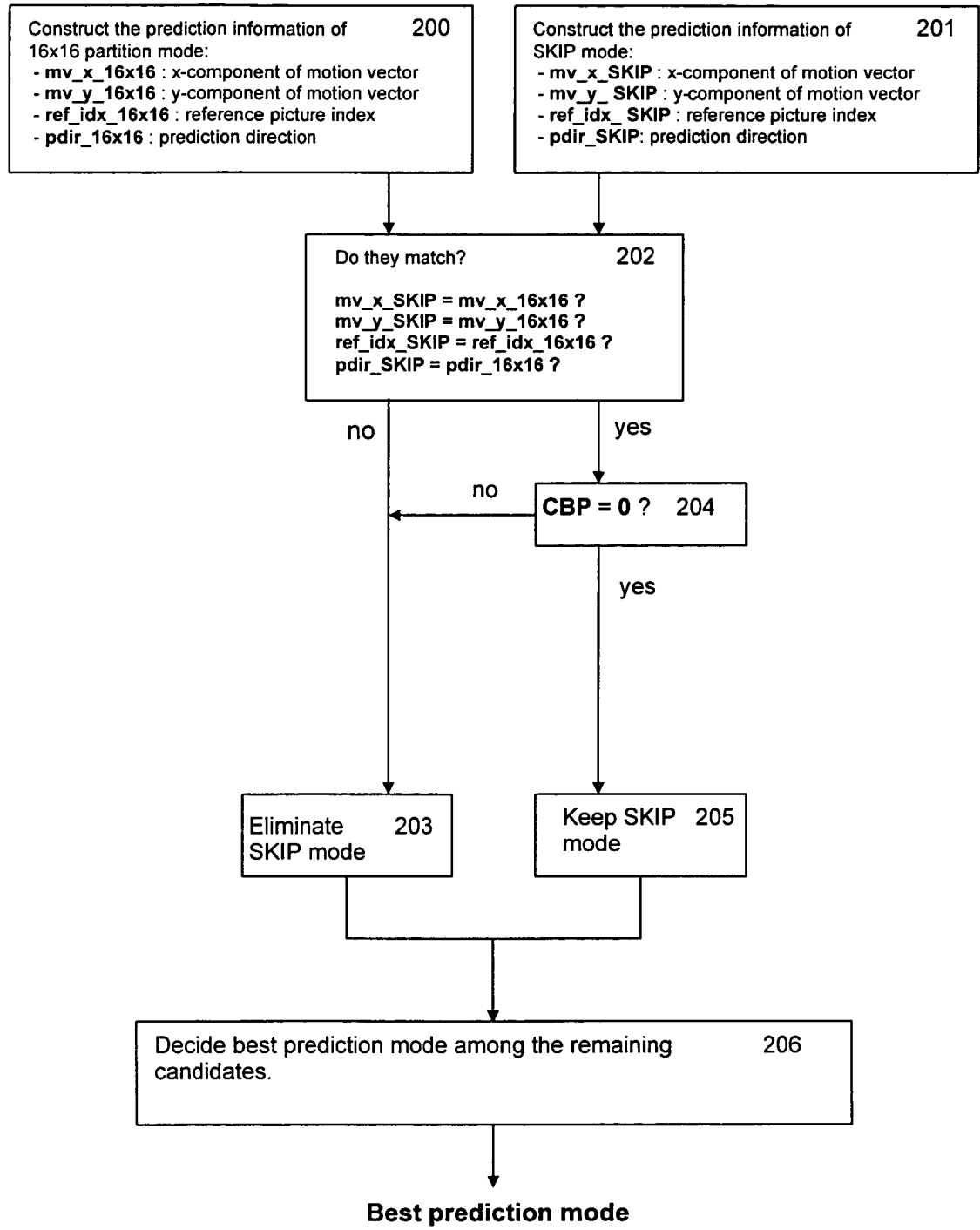
FIG. 2 illustrates a flow chart showing the decision making process in deciding whether to keep the SKIP mode as a candidate in the selection of a best mode.

FIG. 2 illustrates a presently preferred embodiment in the implementation of the decision with respect to the SKIP mode. In 200, the motion vector, the reference picture index, and the prediction direction are calculated for the 16×16 partition mode (mv_x__16×16, mv_y__16×16, ref_idx__16×16, and pdir__16×16, respectively). In 201, the motion vector, the reference picture index, and the prediction direction are calculated for the SKIP mode (mv_x_SKIP, mv_y_SKIP, ref_idx_SKIP, and pdir_SKIP, respectively). Motion vector, reference picture index, and prediction direction of the SKIP mode are calculated from motion vector, reference picture index, and prediction direction of the neighboring sub-units which are already determined and the formula are defined in the specification document of relevant video compression standards. Also, for the purpose of this invention, the details of the methodology in calculating the motion vector, the reference picture index, and the prediction direction of 16×16 partition mode are not important and any standard methods for motion estimation such as those used in existing standards including but not limited to MPEG-X (X=1, 2, 4) as well as H.26L (L=1, 2, 3, 4) can be used.

In 202, the above prediction information of the SKIP and 16×16 partition modes are compared against each other. If they do not match, the SKIP mode is disregarded (203) from the candidate pool. If they match, CBP is calculated and checked to see if CBP is zero (204). If CBP is already zero, the SKIP mode is retained in the candidate pool (205). If CBP is not zero, the SKIP mode is eliminated (203). In the comparison described above, matching criteria can be specified to require exact matching or allowing for certain amount of error.

The best mode is then chosen from the candidate pool among the prediction mode candidates including any intra-picture prediction modes if they are available (206). For the purpose of this invention, the best mode selection may be performed in accordance with available standard methods for mode selection including but not limited to the rate-distortion optimization method used in JM (Joint Model) reference C-model.

Figure 3:
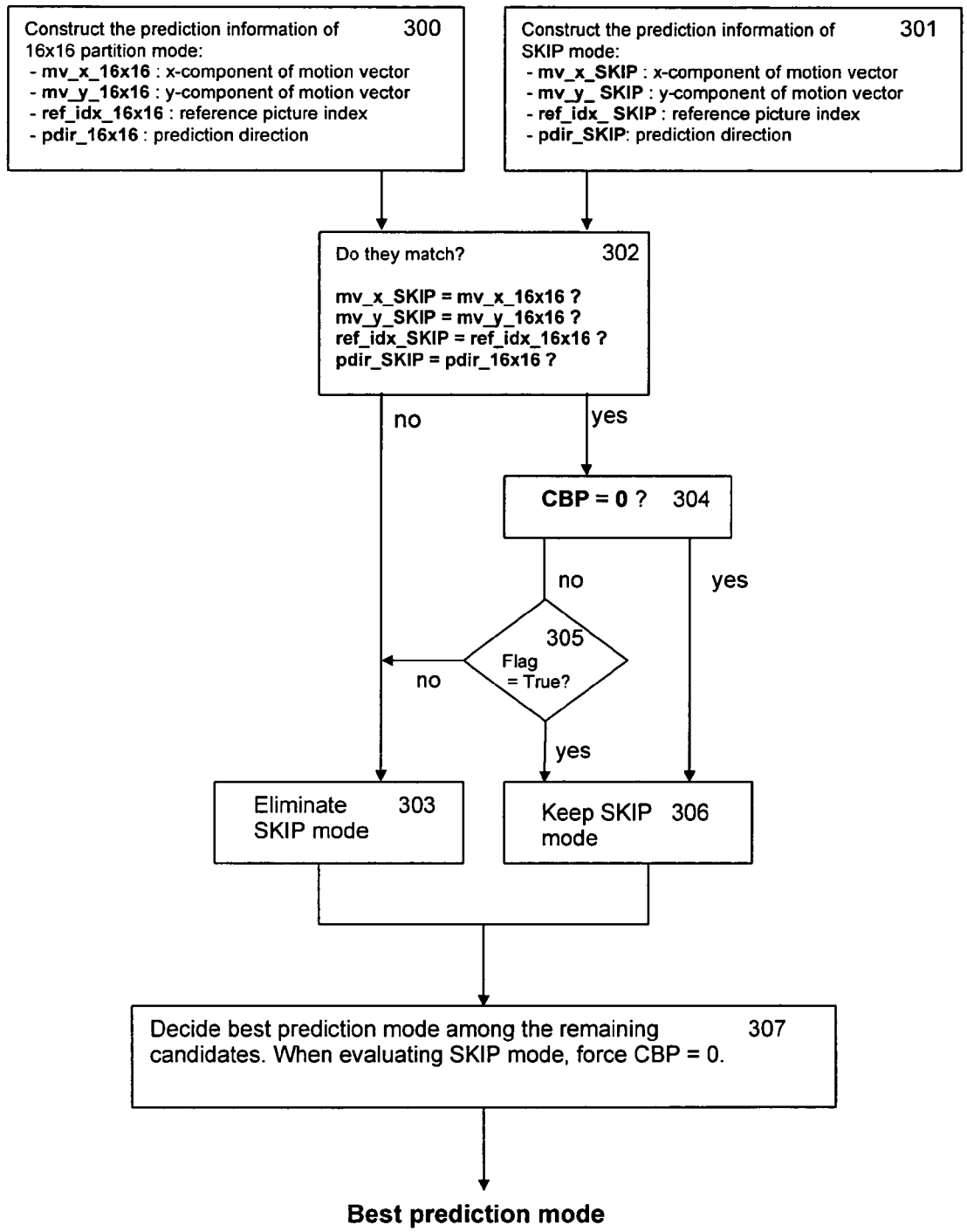
FIG. 3 illustrates another flow chart showing the decision making process in deciding whether to keep the SKIP mode as a candidate in the selection of a best mode.

FIG. 3 illustrates yet another presently preferred embodiment in the implementation of the decision with respect to the SKIP mode. In 300, the motion vector, the reference picture index, and the prediction direction are calculated for the 16×16 partition mode (mv_x__16×16, mv_y__16×16, ref_idx__16×16, and pdir__16×16, respectively). In 301, the motion vector, the reference picture index, and the prediction direction are calculated for the SKIP mode (mv_x_SKIP, mv_y_SKIP, ref_idx_SKIP, and pdir_SKIP, respectively). Motion vector, reference picture index, and prediction direction of the SKIP mode are calculated from motion vector, reference picture index, and prediction direction of the neighboring sub-units which are already determined and the formula are defined in the specification document of relevant video compression standards. Also, for the purpose of this invention, the details of the methodology in calculating the motion vector, the reference picture index, and the prediction direction of 16×16 partition mode is not important and any standard methods for motion estimation such as those used in existing standards including but not limited to MPEG-X (X=1, 2, 4) as well as H.26L (L=1, 2, 3, 4) can be used. In 302, the above prediction information of the SKIP and 16×16 partition modes are compared against each other. If they do not match, the SKIP mode is disregarded (303) from the candidate pool. If they match, CBP is calculated and checked to see if CBP is zero (304). If CBP is already zero, the SKIP mode is retained in the candidate pool (306). In case that CBP is not zero (305), if the switch flag is false, the SKIP mode is then eliminated (303); and if true, the SKIP mode is retained (306) in the candidate pool. In the comparison described above, matching criteria can be specified to require exact matching or allowing for certain amount of error.

In one embodiment, the default value of the switch flag is set to false, and the value may be set by the user to false if power saving is preferred and to true if higher quality is preferred. The best mode is then chosen from the candidate pool among the prediction mode candidates including any intra-picture prediction modes if they are available (307). In the case where the SKIP mode is not eliminated and CBP calculated above is nonzero, it is set to zero in order to simulate and investigate the SKIP mode during the best mode selection process. For the purpose of this invention, the best mode selection may be performed in accordance with available standard methods for mode selection including but not limited to the rate-distortion optimization method used in the JM (Joint Model) reference C-model.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A method for prediction mode selection for video compression among a plurality of prediction modes, comprising the steps of:
    calculating prediction information for each of the prediction modes, wherein the calculating step further comprises:
        calculating, by using a 16*16 partition mode, a first motion vector, a first reference picture index, and a first prediction direction; and
        calculating, by using a skip mode, a second motion vector, a second reference picture index, and a second prediction direction;
    comparing the calculated prediction information of the 16*16 partition mode to the calculated prediction information of the skip mode;
    retaining certain ones of the prediction modes as a function of said compared prediction information, wherein the retaining step further comprises:
        removing the skip mode if said first motion vector not equals said second motion vector, said first reference picture index not equals said second reference picture index, or said first prediction direction not equals said second prediction direction; and
        retaining the skip mode if said first motion vector equals said second motion vector, said first reference picture index equals said second reference picture index, and said first prediction direction equals said second prediction direction; and
    selecting a prediction mode from the retained prediction modes.

2. The method of claim 1 wherein the retaining step further comprises:
    removing the skip mode
    if said first motion vector not equals said second motion vector, said first reference picture index not equals said second reference picture index, or said first prediction direction not equals said second prediction direction,
    else removing the skip mode if a coded block pattern not equals zero.

3. The method of claim 1 wherein the retaining step further comprises:
    removing the skip mode
    if said first motion vector not equals said second motion vector, said first reference picture index not equals said second reference picture index, or said first prediction direction not equals said second prediction direction,
    else removing the skip mode if a coded block pattern not equals zero and an user switch is set to false.

4. A method for selecting a picture prediction mode from a candidate pool of picture prediction modes for video compression, including in said pool a skip mode and a 16*16 partition mode, comprising the steps of:
    calculating, by using the 16*16 partition mode, a first motion vector, a first reference picture index, and a first prediction direction;
    calculating, by using said skip mode, a second motion vector, a second reference picture index, and a second prediction direction;
    removing said skip mode from said pool if said first motion vector not equals said second motion vector, said first reference picture index not equals said second reference picture index, or said first prediction direction not equals said second prediction direction;
    retaining the skip mode if said first motion vector equals said second motion vector, said first reference picture index equals said second reference picture index, and said first prediction direction equals said second prediction direction; and
    selecting a picture prediction mode from said pool.

5. The method of claim 4 wherein the removing step is replaced by the following removing step:
    removing said skip mode from said pool
    if said first motion vector not equals said second motion vector, said first reference picture index not equals said second reference picture index, or said first prediction direction not equals said second prediction direction,
    else removing said skip mode from said pool if a coded block pattern not equals zero.

6. The method of claim 5 wherein said else-removing step is replaced by the following else-removing step:
    else removing said skip mode from said pool if a coded block pattern not equals zero and if a user defined flag is not met.

7. A method comprising:
    calculating prediction information for each of a plurality of prediction modes, wherein the prediction information of the 16*16 partition mode includes a first motion vector, a first reference picture index, and a first prediction direction, and the prediction information of the skip mode includes a second motion vector, a second reference picture index, and a second prediction direction, wherein the calculating further comprises:
        calculating, by using a 16*16 partition mode, a first motion vector, a first reference picture index, and a first prediction direction; and calculating, by using a skip mode, a second motion vector, a second reference picture index, and a second prediction direction;

comparing the calculated prediction information of the 16*16 partition mode to the calculated prediction information of the skip mode;

retaining certain ones of the prediction modes as a function of said compared prediction information, wherein the retaining further comprises removing the skip mode if said first motion vector not equals said second motion vector, said first reference picture index not equals said second reference picture index, or said first prediction direction not equals said second prediction direction; and retaining the skip mode if said first motion vector equals said second motion vector, said first reference picture index equals said second reference picture index, and said first prediction direction equals said second prediction direction; and selecting a prediction mode from the retained prediction modes.

* * * * *